Sept. 7, 1965                C. R. BRADLEE                3,204,504
                          POSITIVE GRIP CUT-OFF
Filed July 12, 1962                                    4 Sheets-Sheet 1
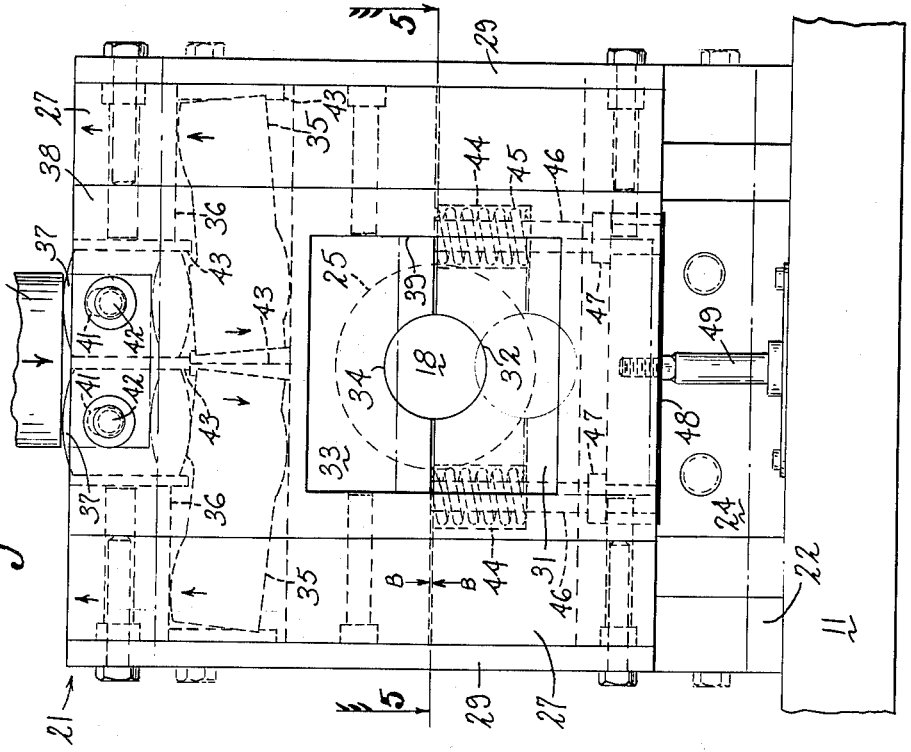
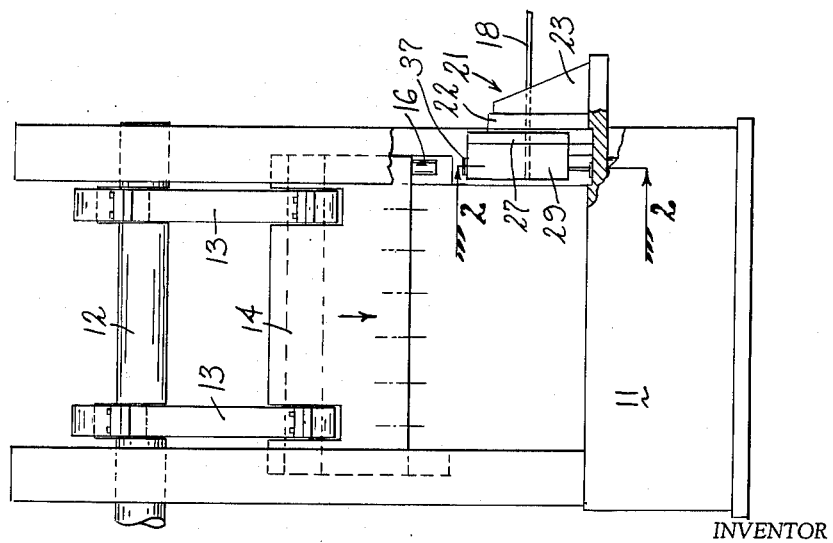
INVENTOR
Charles R. Bradlee
BY
Spencer, Rockwell & Bartholow
ATTORNEY Sept. 7, 1965  C. R. BRADLEE  3,204,504
POSITIVE GRIP CUT-OFF
Filed July 12, 1962  4 Sheets-Sheet 2

INVENTOR
Charles R. Bradlee
BY
Spencer, Rockwell & Bartholow
ATTORNEY

Sept. 7, 1965   C. R. BRADLEE   3,204,504
POSITIVE GRIP CUT-OFF
Filed July 12, 1962   4 Sheets-Sheet 3
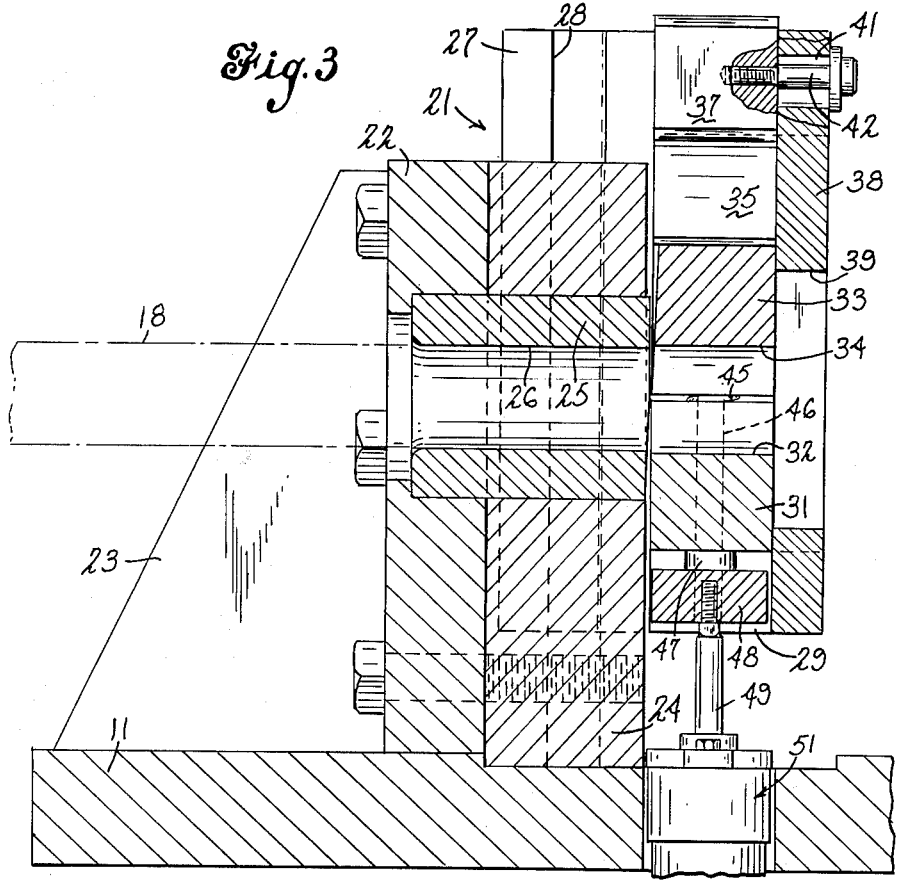
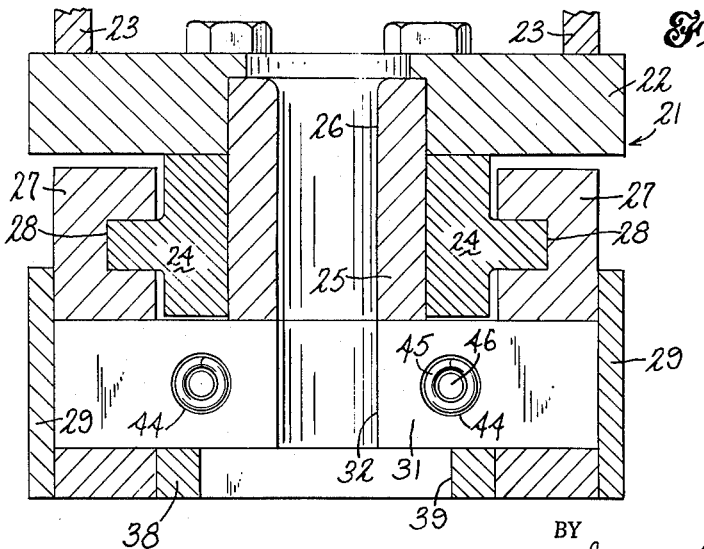
INVENTOR
Charles R. Bradlee
BY
Spencer, Rockwell & Bartholow
ATTORNEY Sept. 7, 1965     C. R. BRADLEE     3,204,504
POSITIVE GRIP CUT-OFF
Filed July 12, 1962     4 Sheets-Sheet 4
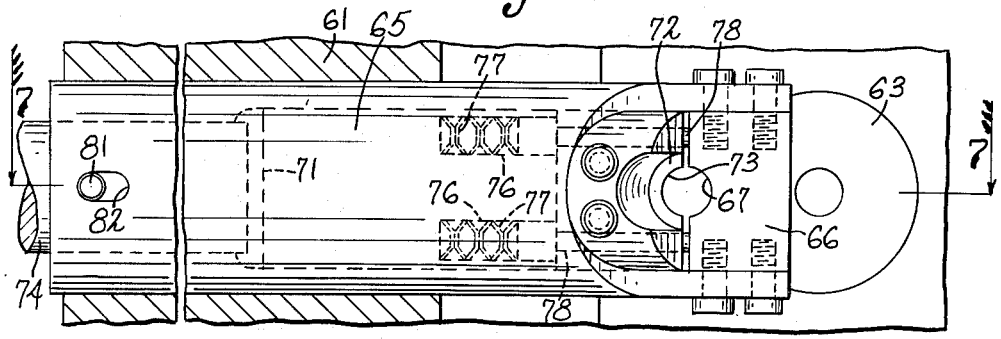
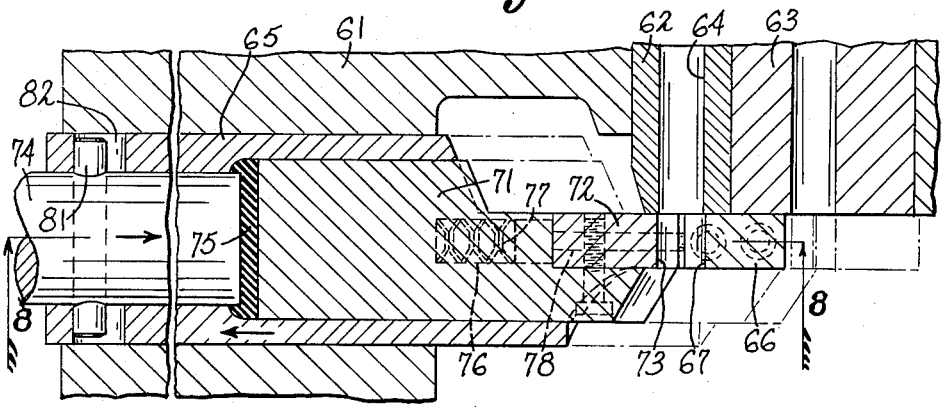
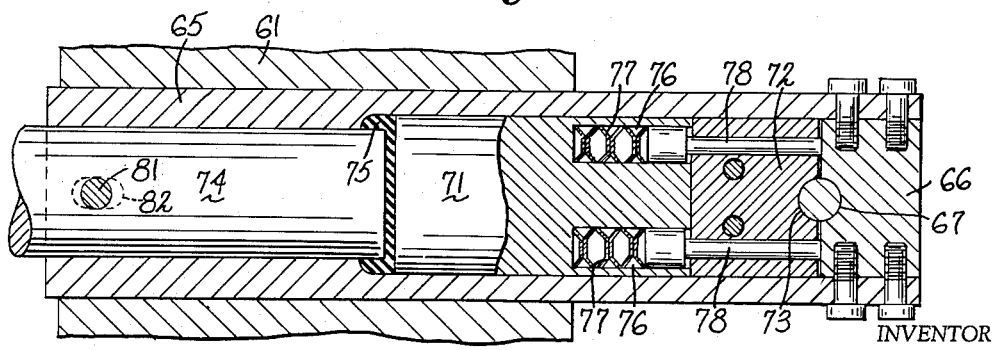
INVENTOR
Charles R. Bradlee

United States Patent Office 3,204,504
Patented Sept. 7, 1965

3,204,504
POSITIVE GRIP CUT-OFF
Charles Robert Bradlee, Cheshire, Conn., assignor to Textron Inc., Providence, R.I., a corporation of Rhode Island
Filed July 12, 1962, Ser. No. 209,424
7 Claims. (Cl. 83—198)

This invention relates generally to an improvement for a press such as a heading or forming machine or the like. The invention is directed to the cut-off mechanism utilized at the initial station, where stock is fed in continuous lengths and workpieces or blanks of a preselected size are severed from the continuous length. More specifically, the invention is directed to a cut-off mechanism which grips the blank and severs it in a continuous operation.

In machines of this type, stock is usually fed to the initial or cut-off station at which workpieces of a desired size are severed from the stock and transferred to the first operating station. Depending upon the gage of the stock, it may be fed to the machine in the form of rods or coils. In any event, a mechanism, usually including a knife, is provided for severing the workpieces with a shear-like action from the stock. A typical cut-off mechanism for a header is shown in U.S. Patent 2,730,731. As shown therein, rod stock 14 is fed through a cut-off die 12, and workpieces of the desired length are severed by means of a slidable knife 15. The configuration of the knife may best be seen in FIG. 4. While such a mechanism is certainly adequate for the purpose, one skilled in the art will readily understand that the cut-off provided by such a mechanism is not a true shear, since the workpiece being severed is not positively gripped during the shearing operation. Thus, using the mechanism shown in aforementioned Patent 2,730,731, it is possible that a certain amount of bending and necking of the workpiece will occur during the severing operation. Furthermore, a cut-off mechanism such as is shown in the aforementioned patent gives the header a dual tonnage rating, viz. a rating for the gate and a rating for the cut-off mechanism. This may place further limitations on the operations which may be performed by the header since the requirements of the heading operation must fall within the rating of the gate while the requirements of the cut-off operation must fall within the usually lower rating of the cut-off mechanism.

Accordingly, it is an object of this invention to provide a cut-off mechanism for severing workpieces from a length of stock which effects cut-off with a true shearing operation.

Another object of the invention is to provide improved means for positively gripping the workpiece during cut-off.

A further object of the invention is to provide means for gripping the workpiece and severing it in a continuous operation.

Still another object of the invention is to provide cut-off means which grip the workpiece with a force proportional to the force required for shearing the workpiece.

Another object of the invention is to provide a header having a single tonnage rating for both the gate and the cut-off mechanism.

A further object of the invention is to provide a cut-off mechanism which is operated by the gate to effect shearing of the workpiece.

Still other objects and advantages of the invention will in part be obvious and will in part be apparent from the specification.

Generally speaking, the invention is directed to providing die halves adapted to grip the workpiece before it is severed. One of the die halves is advanced into engagement with the workpiece by means of a punch, for example, and force-transmitting means are provided to advance the second die half into contact with the workpiece before continued movement of the first die half may take place. Since the force-transmitting means cooperatively connect the first die half to the second die half, the gripping force will be proportional to the shearing force. After the workpiece has been positively gripped, both die halves will continue to move by means of the action of the punch and sever the workpiece from the stock. If desired, the workpiece can be moved by the closed die halves to the first operating station.

The invention accordingly comprises the features of construction, combinations of elements, and arrangements of parts which will be exemplified in the constructions hereinafter set forth, and the scope of the invention will be indicated in the claims.

For a fuller understanding of the invention, reference is had to the following description taken in connection with the accompanying drawings, in which:

FIG. 1 is an elevational view of a vertical press showing, by way of example, the location of the cut-off mechanism with relation to the gate;

Figure 2:
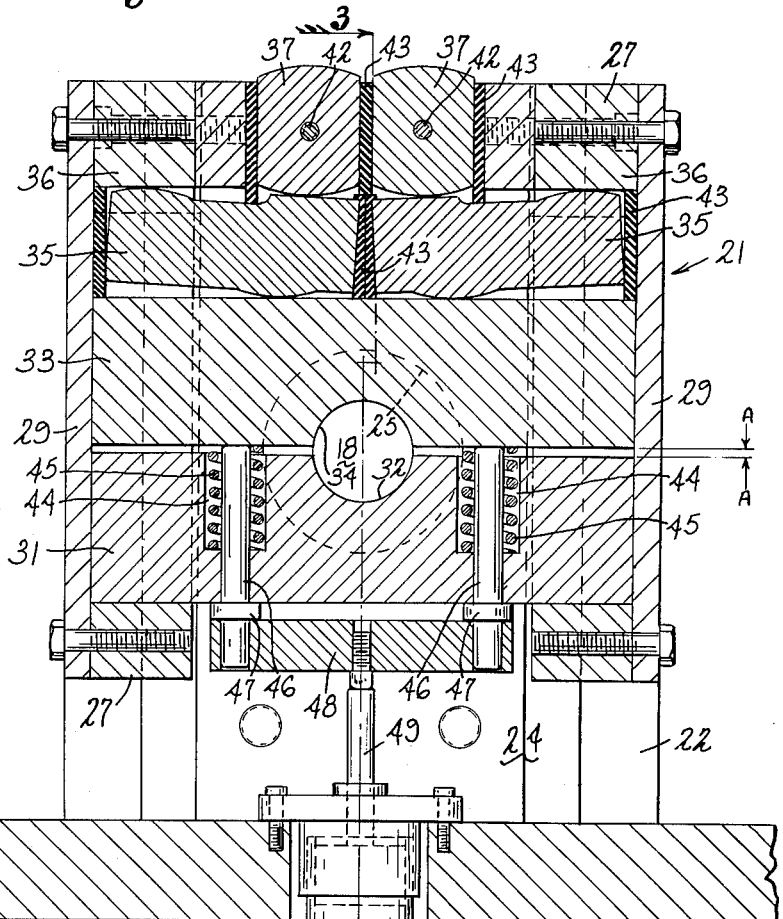
FIG. 2 is a sectional view taken along line 2—2 of FIG. 1, showing details of one form of the invention.
Figure 2A:
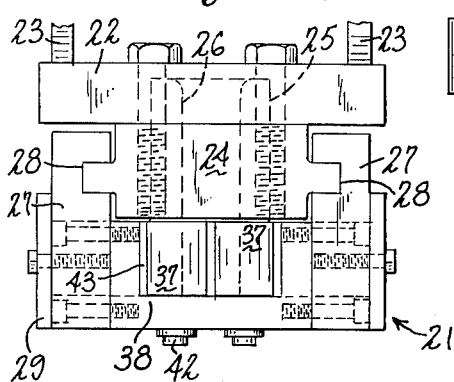

FIG. 2ª is a top plan view, in reduced scale, of the mechanism shown in FIG. 2;

FIG. 3 is a sectional view taken along line 3—3 of FIG. 2;

FIG. 4 is an elevational view of the mechanism similar to FIG. 2, but showing the dies in the gripping position;

FIG. 5 is a sectional view taken along line 5—5 of FIG. 4;

FIG. 6 is a plan view of a second embodiment of the invention;

FIG. 7 is a sectional view taken along line 7—7 of FIG. 6; and

FIG. 8 is a sectional view taken along line 8—8 of FIG. 7, showing the dies in the gripping position.

Referring now to FIG. 1, an example of one type of machine is shown which may be provided with the positive grip cut-off mechanism. In the example shown, the header comprises a frame 11, a crank shaft 12 rotatably mounted in the frame and driven by suitable means, not shown, pitmans 13, and a gate 14 operatively connected to the crank shaft through the pitmans. The positive-grip cut-off mechanism is shown generally at 21, and its juxta-position to the frame of the header may be seen. Rod stock 18 is fed to the cut-off mechanism by means of any known type of feeding mechanism, and the gate is provided with an operating punch 16 adapted to operate the cut-off mechanism, as will be hereinafter described.

Mechanism 21 is shown in greater detail in FIGS. 2, 2ª and 3, the parts being shown in position on frame 11, with operating punch 16 being shown in FIG. 2. Attached to frame 11 is a support 22 further secured by suitable flanges 23.

A guideway 24 is attached to support 22. The guideway is more clearly shown in FIG. 2ª and in section in FIG. 5. Mounted within support 22 and guideway 24 is a holding die 25 provided with an aperture 26 adapted to receive rod stock 18, shown in phantom in FIG. 3. Holding die 25 may be replaced by one of any number of holding dies having different apertures, the aperture being selected to slidably receive the particular size of rod stock being fed to the cut-off mechanism.

Moving frame members 27 are provided with opposed keyways 28 which slidably engage suitable grooves in guideway 24. Secured to moving frame members 27 between side plates 29 is a lower cut-off die half 31 provided with a substantially semicircular aperture 32. Moving frame members 27 are secured to a front plate 38 which is provided with an aperture 39 to freely pass the rod stock. Moving frame members 27 are held in parallel relationship by means of front plate 38, as may be seen in FIG. 2ª. Slidably mounted between side plates 29 is an upper cut-off die half 33 provided with a substantially semicircular aperture 34 which, taken together with semicircular aperture 32, form an aperture adapted to receive rod stock 18.

Positioned above upper die half 33 are a pair of rocker blocks 35 which lie between side plates 29. The upper outer end portions of rocker blocks 35 engage the upper bearing portions 36 of moving frame members 27. Positioned above rocker blocks 35 and adapted to engage the upper inner portions thereof are a pair of pusher blocks 37. The upper portion of front plate 38 is provided with two elongated slots 41 which freely accommodate screws 42 threadedly engaged in pusher blocks 37. Screws 42 in elongated slots 41 limit vertical movement of pusher blocks 37, as will hereafter be described. It should be noted at this point that, while references are made to vertical movement, upper and lower die halves, and the like, such reference is merely for the sake of clarity, it being understood that the cut-off mechanism could be positioned for movement in any direction or plane.

Rocker blocks 35 and pusher blocks 37 are positioned to float relative to the moving frame members. To maintain the relationship of the floating blocks, a plurality of rubber or other resilient spacers 43 may be provided between each of the blocks and the frame members to limit movement without causing unnecessary restriction.

A pair of blind holes 44 are provided in lower die half 31 extending from the interface of the upper and lower die halves. Positioned in each of the blind holes is a coil spring 45 which urges the die halves apart. Slidably mounted in the lower die half and extending through the blind holes and the coil springs are a pair of return pins 46 each being provided with a shoulder 47 adapted to bear against the lower surface of die half 31. The outer ends of return pins 46 are received in a return block 48 which is threadedly engaged by a plunger 49. Plunger 49 extends from a piston-and-cylinder assembly, indicated generally at 51, which is mounted to frame 11 and which effects return of the die halves after the cut-off operation, as will be described below.

The operation of the positive grip cut-off mechanism may best be described with reference to FIGS. 2 through 4. The rest or normal position of the cut-off mechanism is shown in FIGS. 2 and 3. Rod stock 18 is fed through holding die 25 by means of any suitable mechanism (not shown), and is advanced through the aperture in the upper and lower die halves by a preselected amount determined by the length of workpiece to be severed. The clearance between the die halves in the rest position, as indicated by A—A in FIG. 2, permits the rod stock to be freely fed through the opening in the die halves formed by semicircular apertures 32 and 34. Since operating punch 16 is in the retracted position, springs 45 insure separation of the die halves. On the down stroke of the operating punch 16 pusher blocks 37 are contacted as shown in FIG. 4. They in turn contact rocker blocks 35, causing them to advance upper die half 33 into contact with the rod stock. When the rod stock is engaged by the upper die half, the shearing force of the stock resists further movement of the upper die half and the rocker blocks are caused to rock about the point of engagement of each rocker block with the upper surface of die half 33. This causes the rocker blocks to bear against upper bearing portions 36, as shown by the arrows in FIG. 4, thereby raising moving frame members 27 and with it lower die half 31. The upward movement of lower die half 31 will continue until the die half contacts rod stock 18. At this point, separation between the die halves will be greatly reduced, as shown by B—B in FIG. 4. As additional pressure is applied by operating punch 16, the die halves will grip the rod stock with an increasing force until the force for shear of the rod stock is attained. The closing movement of the upper and lower die halves compresses coil springs 45 and also displaces return pins 46 so that shoulders 47 are moved out of contact with the lower surface of die half 31.

As the shear force is attained, continued advancement of operating punch 16 advances the entire moving frame including the front plate and the die halves to the position shown by the phantom representation of the die aperture in FIG. 4, thereby shearing a workpiece from the rod stock. As the moving frame is advanced, return pins 46 advance plunger 49 into the cylinder-and-piston assembly 51 through return block 48. At the end of the advance stroke of operating punch 16, the workpiece will have been severed along a plane between the interface of holding die 25 and the upper and lower die halves. As the operating punch is retracted, pneumatic or hydraulic pressure from any suitable source (not shown) is applied to the cylinder-and-piston assembly to return the moving frame to its rest position and to assist coil springs 45 in separating the die halves so that the severed workpiece may be ejected from the die halves and new rod stock fed through the cut-off die.

From the foregoing description, it is evident that the workpiece is securely gripped while it is being sheared from the rod stock, thereby substantially eliminating distortion, bending and necking of the workpiece. It is also evident that the force with which the rod stock is gripped during cut-off will vary for different rod stock sizes and materials, since shearing will not take place until the stock is gripped with a force approaching the shearing force.

An alternate form of the invention is shown in FIGS. 6 through 8. A machine frame 61 carries a holding die 62 and an operating die 63. The holding die is provided with an aperture 64 adapted to receive the rod stock which is to have workpieces severed therefrom. A moving frame 65 is slidably mounted in frame 61 and carries a die half 66 provided with a substantially semicircular aperture 67. Slidably mounted in moving frame 65 is a plunger 71 to which is attached a die half 72 also provided with a substantially semicircular aperture 73. Semicircular apertures 67 and 73, taken together, form the opening through which the rod stock is advanced into contact with a stop or other suitable means for selecting the length of workpiece to be severed.

An operating rod 74 slidably enters moving frame 65, and the end of operating rod 74 within the moving frame is spaced from the end of plunger 71 within the moving frame. The cavity therebetween is filled with a hydraulic material having an elastic, plastic or other fluid form, such as oil, rubber, grease, putty or any other material which will deform under stress and transmit pressure in a hydraulic manner.

Plunger 71 is provided with a pair of blind holes 76 in which are mounted springs 77 contacting the ends of spacer rods 78 slidably mounted through die half 72 into contact with the closing face of die half 66. These spacer rods, through the springs, serve to separate the halves in the rest or normal position of the cut-off mechanism. Secured through operating rod 74 is a pin 81 whose ends engage elongated slots 82 in the moving frame. The engagement of pin 81 with the elongated slots serves to limit relative movement between the moving frame and operating rod 74, and also provides means for retracting the moving frame from the advanced position, as will hereafter be described.

The rest position of this embodiment is shown in FIGS. 6 and 7, wherein the rod stock is fed through holding die 62 and the separated die halves. As operating rod 74 is advanced in the direction indicated by the arrow in FIG. 7, the pressure is transmitted through hydraulic material 75 against plunger 71, thereby advancing die half 72 into contact with the rod stock. When the contact is made, further movement of the plunger will be resisted and the build-up in pressure by the continued movement of operating rod 74 will be transmitted through the hydraulic material against the moving frame. The pressure against the moving frame will cause it to move in the direction shown by the arrow in FIG. 7, thus moving die half 66 into contact with the rod stock. As the die halves are closed on the rod stock, continued movement of operating rod 74 will cause the rod stock to be gripped with a force approaching the shearing force of the stock. Thereafter, continued movement of the operating rod will move the entire moving frame 65 and the die halves to the right, as shown in FIG. 8, thereby severing the workpiece from the stock. If desired, the cut-off die can be utilized to move the workpiece into position opposite an operating die, and an operating punch (not shown) may perform the forming operation on the workpiece while concurrently ejecting it from the cut-off die. The advanced position of the moving frame is also shown in phantom in FIG. 7.

As operating rod 74 is retracted, engagement of pin 81 with elongated slots 82 returns the moving frame to the rest position, and the reduction of pressure in the hydraulic material allows springs 77 to effect separation of the die halves.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a mechanism for shearing a workpiece from a length of stock, the combination comprising a frame, a holding die mounted in said frame for receiving and holding a length of stock, a moving frame slidably mounted in said frame, a first die half mounted to said moving frame, a plunger slidably mounted in said moving frame, a second die half secured to said plunger, said first and second die halves adapted to be closed upon each other to form a single die capable of gripping a workpiece therebetween, said first and second die halves being adjacent said holding die and defining a shearing plane therebetween, an operating rod slightly mounted in said moving frame, said operating rod, said plunger, and a portion of said moving frame defining therebetween a cavity within said moving frame, and elastically deformable hydraulic material in said cavity, said portion of said moving frame including means responsive to said hydraulic material for moving said first die half, whereby advancement of said operating rod advances said second die half through said hydraulic material into contact with the workpiece and subsequently moves said moving frame and said first die by means of said hydraulic material into engagement with the workpiece, and whereby continued movement of said operating rod thereafter effects movement of said first and second die halves in a single direction relative to said holding die to shear the workpiece from the length of stock.

2. The structure defined in claim 1, and further including a return mechanism mounted between said operating rod and said moving die frame to return said first die to a position to receive stock upon the return stroke of said operating rod.

3. The structure defined in claim 2, wherein said return mechanism comprises a pin secured through said operating rod and having ends extending therefrom and elongated slots in said moving frame encircling the ends of said pins.

4. The structure defined in claim 2, and further including spring-controlled means engaging said first and second die halves for yieldably effecting separation of said die halves upon the return stroke of said operating rod.

5. In a mechanism for shearing a workpiece from a length of stock, the combination comprising a first frame, a second frame slidably mounted in said first frame, a first die half rigidly coupled to said second frame, a second die half slidably mounted within said second frame for mating with said first die half, a plunger slidably mounted within said second frame and coupled to said second die half, an operating rod slidably movable within said second frame, said operating rod, said plunger, and said second frame defining therebetween a cavity, a hydraulic fluid in said cavity, stid second frame including means forming a portion of the cavity responsive to said hydraulic fluid for moving said second frame with respect to said first frame and said rod, cavity and said plunger being of such respective dimensions that upon continuous motion of said rod toward said plunger the second die half moves toward the first die half and then stops on contact with said workpiece, then the second die half and the second frame move toward the second die half and in contact with the workpiece, then both said die halves move in unison in the same direction as the motion of the operating rod.

6. In a mechanism for shearing a workpiece from a length of stock, the combination comprising a first frame, a second frame slidably mounted in said first frame, a first die half rigidly coupled to said second frame, a second die half slidably mounted within said second frame for mating with said first die half, said second frame including first and second internal portions separated by shoulder means, a plunger slidably mounted within the first internal portion of said second frame and coupled to said second die half, an operating rod slidably movable within the second internal portion of said second frame, said operating rod, said shoulder means of said second frame and said plunger defining therebetween a cavity, a hydraulic fluid in said cavity, and said rod, cavity and said plunger being of such respective dimensions that upon continuous motion of said rod toward said plunger the second die half moves toward the first die half and then stops on contact with the workpiece, then the first die half and the second frame move toward the second die half and in contact with the workpiece and then both die halves move in unison in the same direction as the motion of the operating rod, and a number of spacer rods slidably mounted in said second die half and contacting said first die half for separating the die halves.

7. In a mechanism for shearing a workpiece from a length of stock, the combination comprising a first frame, a second frame slidably mounted in said first frame, a first die half rigidly coupled to said second frame, a second die half slidably mounted within said second frame for mating with said first die half, a plunger slidably mounted within said second frame and coupled to said second die half, an operating rod slidably movable within said second frame, said operating rod, said plunger, and a portion of said second frame defining therebetween a cavity within said second frame, a hydraulic fluid in said cavity, said portion of said second frame including shoulder means responsive to said hydraulic fluid to move said first die, and said second frame having a plurality of elongated slots and a pin passing through said rod and having pin ends engaging said slots to limit relative motion between the second frame and the operating rod and providing means for retracting the second frame.

References Cited by the Examiner

UNITED STATES PATENTS

| 260,178 | 6/82 | Durfee | 83—384 |
| 2,136,831 | 11/38 | Vuilleumier | 83—198 |
| 2,939,353 | 6/60 | Vickers | 83—199 |

FOREIGN PATENTS

| 230,309 | 6/44 | Switzerland. |

ANDREW R. JUHASZ, *Primary Examiner.*